(12) United States Patent
Böhringer et al.

(10) Patent No.: US 7,149,786 B1
(45) Date of Patent: Dec. 12, 2006

(54) NETWORK FOR DATA TRANSMISSION

(75) Inventors: Harald Böhringer, Fellbach (DE);
Stefan Kaiser, Ditzingen (DE);
Andreas Kraut, Ludwigsburg (DE);
Walter Nehr, Stuttgart (DE); Steffen Schwips, Kirchberg an der Murr (DE)

(73) Assignee: Jetter AG, Ludwigsburg (DE)

( * ) Notice: Subject to any disclaimer, the term of this patent is extended or adjusted under 35 U.S.C. 154(b) by 0 days.

(21) Appl. No.: 09/806,793

(22) PCT Filed: Oct. 4, 1999

(86) PCT No.: PCT/EP99/07345

§ 371 (c)(1),
(2), (4) Date: Apr. 4, 2001

(87) PCT Pub. No.: WO00/20935

PCT Pub. Date: Apr. 13, 2000

(30) Foreign Application Priority Data

Oct. 6, 1998 (DE) .................. 198 45 876

(51) Int. Cl.
*G06F 15/16* (2006.01)
(52) U.S. Cl. ...................... 709/208; 709/209
(58) Field of Classification Search ............... 709/249, 709/208–210; 710/316; 370/412
See application file for complete search history.

(56) References Cited

U.S. PATENT DOCUMENTS

| 5,544,163 | A |   | 8/1996 | Madonna |
|---|---|---|---|---|
| 5,781,530 | A |   | 7/1998 | Segal |
| 5,790,786 | A |   | 8/1998 | Wakeman et al. |
| 5,930,523 | A | * | 7/1999 | Kawasaki et al. ............ 712/32 |
| 6,085,238 | A | * | 7/2000 | Yuasa et al. ................. 709/223 |
| 6,098,110 | A | * | 8/2000 | Witkowski et al. ......... 709/249 |
| 6,430,626 | B1 | * | 8/2002 | Witkowski et al. ......... 709/249 |
| 6,549,938 | B1 | * | 4/2003 | Kilkki et al. ............... 709/207 |
| 6,735,683 | B1 | * | 5/2004 | Kawasaki et al. ............ 712/1 |
| 6,772,267 | B1 | * | 8/2004 | Thaler et al. ............... 710/306 |
| 6,779,043 | B1 | * | 8/2004 | Crinion ..................... 709/249 |

FOREIGN PATENT DOCUMENTS

| AT | 364 407 | 10/1981 |
|---|---|---|
| DE | 33 43 456 | 9/1992 |
| DE | 197 20 401 | 3/1998 |
| JP | 58 092006 | 6/1983 |
| WO | WO96/29635 | 9/1996 |

\* cited by examiner

*Primary Examiner*—Abdullahi Salad
(74) *Attorney, Agent, or Firm*—Collard & Roe, P.C.

(57) ABSTRACT

Novel configuration preventing collision of data transmissions on data transmission paths. Repeated transmission attempts after said collisions thus become unnecessary. Transmission capacity of the data network can be used optimally resulting in considerably faster control.

10 Claims, 2 Drawing Sheets

NETWORK FOR DATA TRANSMISSION

CROSS REFERENCE TO RELATED APPLICATIONS

Applicants claim priority under 35 U.S.C. §119 of German Application No. 198 45 876.2 filed Oct. 6, 1998. Applicants also claim priority under 35 U.S.C. §365 of PCT/EP99/07345 filed Oct. 4, 1999. The international application under PCT article 21(2) was not published in English.

BACKGROUND OF THE INVENTION

1. Field of the Invention

The invention concerns a network for data transmission with modules linked together for data exchange and hub switches, each with several terminals and assigned and/or integrated memory array, with each hub switch connecting its terminals in pairs while disconnecting from all other terminals and/or temporarily storing the data packets forwarded via the terminals separately and only forwarding them to the respective address terminal when it is available for data reception and/or can be disconnected.

2. The Prior Art

These types of networks are known in principle in the field of communication networks, cf., for example, the U.S. Pat. Nos. 5,544,163, 5,781,530, and 5,790,786.

However, this technology has not yet gained favor in the control of industrial processes.

Rather, in typical process controls, the modules of the control are linked together via a bus, whereby it is provided that the individual modules transmit the data received by them, which is to be forwarded to other modules, at arbitrary times, determined without regularity. The data exchange can, however, only function if the data of one single module at a time is transmitted on the bus. If two or more data modules transmit their data simultaneously, each of these data modules immediately ends its data transmission and repeats the respective data transmission after a period of time determined by random generation. In this way, the previously mentioned data modules can, as a rule, be prevented by probability from again simultaneously attempting to transmit. It is also provided in current systems that a data module only begins to transmit if the bus is idle, i.e. no data transmission of another data module is detectable. In this way, it is ensured that a data transmission initiated by a data module cannot be interrupted during the transmission by another data module beginning to transmit. In widespread process controls, colliding data transmissions occur comparatively frequently, with the consequence that the data exchange can be delayed significantly and/or to such a degree that an optimal control of the respective process is no longer possible and/or is no longer possible with the desired rapidity.

SUMMARY OF THE INVENTION

It is therefore an object of the invention to create a network suitable for the control of industrial processes which makes possible a data exchange having good reproducibility in regard to the time required.

This object is achieved according to the invention in that in a process control with several programmable controllers linked through the hub switches, each including a central processing unit and slave processors, each programmable controller is assigned a hub switch with separate terminals for the slave processors and the central processing unit of the respective programmable controller, and each slave processor can exchange data with arbitrary modules while circumventing its assigned central processing unit.

These types of hub switches are commercially available as, for example, "Ethernet switches" and have a complete transmitter and receiver for each terminal, so that each terminal is continuously available for the transmission or reception of data, and data reaching the terminal is continuously saved or, if another terminal is idle, can be forwarded to this other terminal.

Additionally or alternatively, a bus can be provided which links together access control units (MAC, media access controller), monitored by a transmission control, via which the bus is connected with at least one assigned terminal of a hub switch and/or a central processing unit (CPU), slave processors, and/or a programming device, with the transmission control exclusively switches the transmission authority of the access control units cyclically and/or according to presettable priority.

The invention is based on the general idea of preventing colliding data transmissions in a data line through a particular physical structure of the process control and/or through control of the data exchange. Incalculable delay times when accessing a bus and/or a data line are thereby prevented from occurring and the time needed for a data exchange can be calculated exactly and/or within very narrow boundaries.

The linked hub switches subdivide the data transmission chain they form into a number of sections which are, on one hand, available for simultaneously performed data transmissions which are independent of one another, and, on the other hand, with appropriate switching of the hub switches, can form one single continuous data transmission line.

A particular advantage of the hub switches is that they offer the possibility that, in principle, a terminal can be connected to each hub switch as a programming input. On one hand, this offers the advantage of decentralized programming. On the other hand, it is advantageous that when programming the data modules connected to the respective hub switch, the line system linked with the hub switches does not have to be stressed. Rather, the terminal of a hub switch connected as a programming input can communicate internally via the hub switch with its other terminals and thereby with the data modules coupled to them.

The bus and/or the buses with transmission control are advantageously provided for partial systems of the process control and are each assigned a terminal of a hub switch.

The advantage is thereby attained that the hub switch and/or the hub switch system can be conceived with relatively few terminals, because the previously mentioned bus "multiplies" the hub switch terminal assigned to it according to the idle access control units of the respective bus available.

This type of bus system with transmission control does typically have a lower performance capacity than a hub switch system, because each bus forms a unit which cannot be subdivided into subsegments and is only available for one data transmission to or from a data module coupled to the bus at a time. Nonetheless, such a bus system is often completely sufficient for subsystems, particularly for those systems which only have a comparatively small requirement for communication with other subsystems of the process control and, correspondingly, only slightly load the hub switch system during operation of the process control.

With the combination of the hub switch system with bus systems monitored through transmission control, consideration is advantageously taken of the fact that a process control often must link partial systems which are widely spatially separated, and which, on their part, consist of comparatively closely neighboring modules. The closely neighboring modules can then be linked together through the comparatively economical bus systems with typical transmission technology, while the hub switches communicate with one another via optical fibers or other line systems which are conceived for data transmission over large distances and are correspondingly more expensive.

Each hub switch and each bus with transmission control offers, in principally the same way, the possibility of linking the central processor of a programmable controller with assigned slave processors and/or slave units, and doing so in such a way that the slave processors and/or slave units can, if necessary, exchange data with arbitrary data modules of the process control while circumventing the central processor.

On one hand, an appreciable load reduction of the central processor is thereby made possible. On the other hand, the necessary data exchange can be significantly accelerated. Furthermore, the respective central processor can process the tasks incumbent to it faster, without being "disturbed" by data exchange between a slave processor or similar device assigned to it and other parts of the process control.

BRIEF DESCRIPTION OF THE DRAWINGS

In the following, reference is made to the claims and to the subsequent description of the drawings in regard to preferred characteristics of the invention, with the aid of which the preferred embodiment variations of the invention will be described in more detail.

These show

DETAILED DESCRIPTION OF PREFERRED EMBODIMENTS

Figure 1:
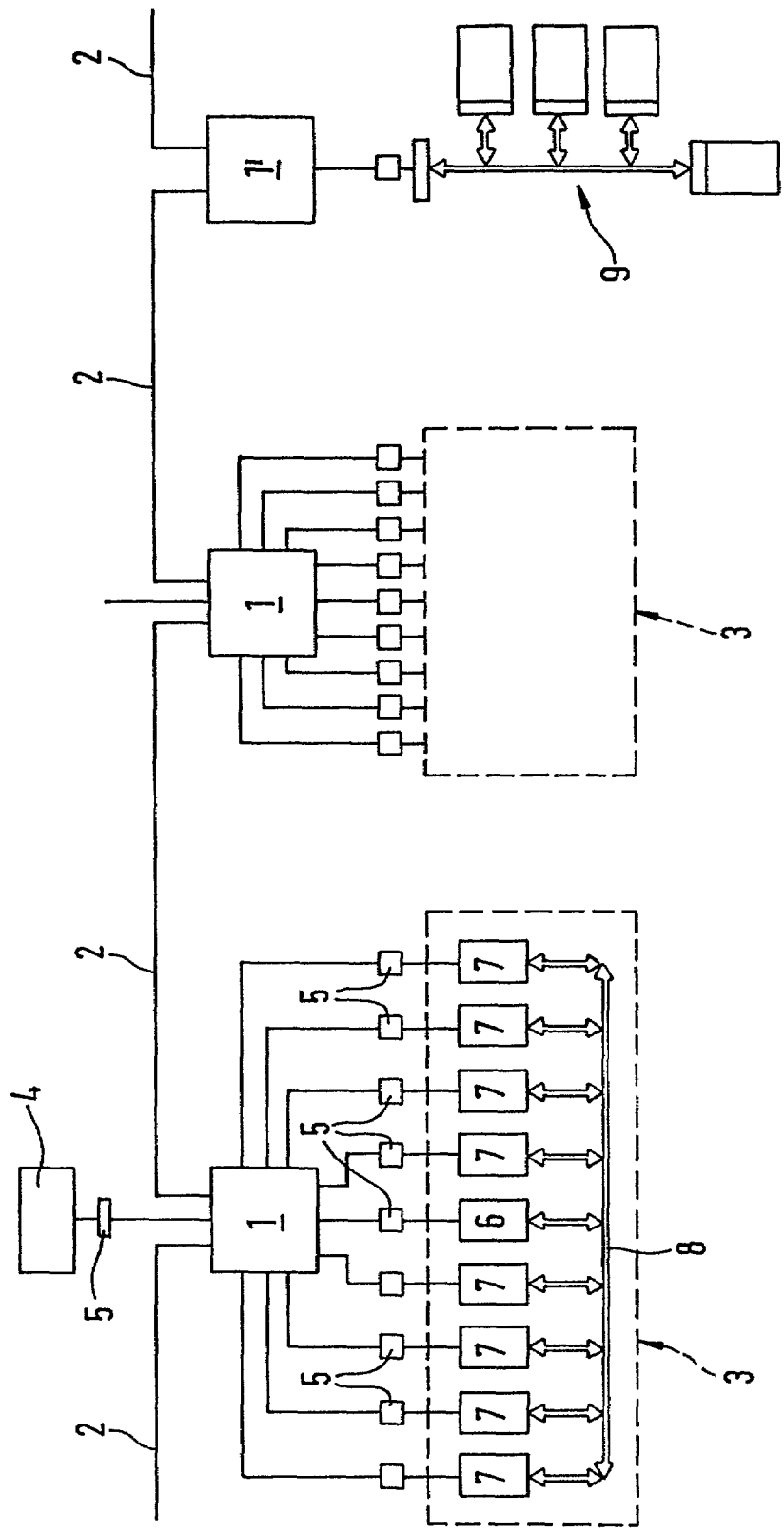
FIG. 1 a schematic depiction of a hub switch chain.

According to FIG. 1, a number of hub switches 1 are linked together, for example via fiber-optic cable 2. These hub switches 1 have a number of terminals which, on one hand, serve the fiber-optic cable 2 serving to link the hub switches and, on the other hand, serve for the modules of a programmable controller 3 and/or for a programming device 4.

Insofar as the hub switches 1 are provided for other types of signals, optical signals in the present example, than the units to be coupled to the terminals of the hub switches, which could, for example, be provided for processing of electrical signals, appropriate interfaces and/or interface modules 5 are located and/or integrated in the hub switches 1 or the connected modules 6 and 7.

The hub switches 1 can separately store data entering their terminals and relay it via another terminal, which leads to the desired receiver for the data previously mentioned, with this relay only and/or first occurring when the previously mentioned other terminal is idle.

The storage of the data entering via a terminal can, if necessary, be omitted if the other terminal, via which this data must be relayed, is already idle when the previously mentioned data arrives. In principle, a temporary storage of the data can, however, also be provided in such a case, with the input of the data into the storage and the transmission of the data from the storage able to occur practically simultaneously and a "virtual" direct connection between two terminals of the hub switch created by the storage.

The programmable controller 3 includes, in a basically known way, a central processing unit 6 (CPU), as well as several slave processors 7.

A characteristic of the invention is, thus, that both the processing unit 6 and the slave processors 7 are assigned separate terminals of the hub switch 1 assigned to the respective programmable controller 3. In this way, it is made possible for each slave processor 7 (or another data module of the programmable controller 3) to communicate with, in principle, any arbitrary data module of the entire process control via the assigned hub switch 1 while circumventing the assigned central processing unit 6.

If necessary, the programmable controller can also have a bus 8, via which the central processing unit 6 and the slave processors 7 can communicate with one another while circumventing the assigned hub switch 1.

As is described further below, a collision of data transmissions on the bus 8 can be prevented through transmission control.

In the example of FIG. 1, a hub switch 1' has only comparatively few terminals, in the example depicted three terminals, of which two terminals are, in turn, provided for fiber-optic cable 2 for networking with other hub switches 1 and/or 1', while one terminal is assigned to a bus system 9 which will be described in the following with reference to FIG. 2.

Figure 2:
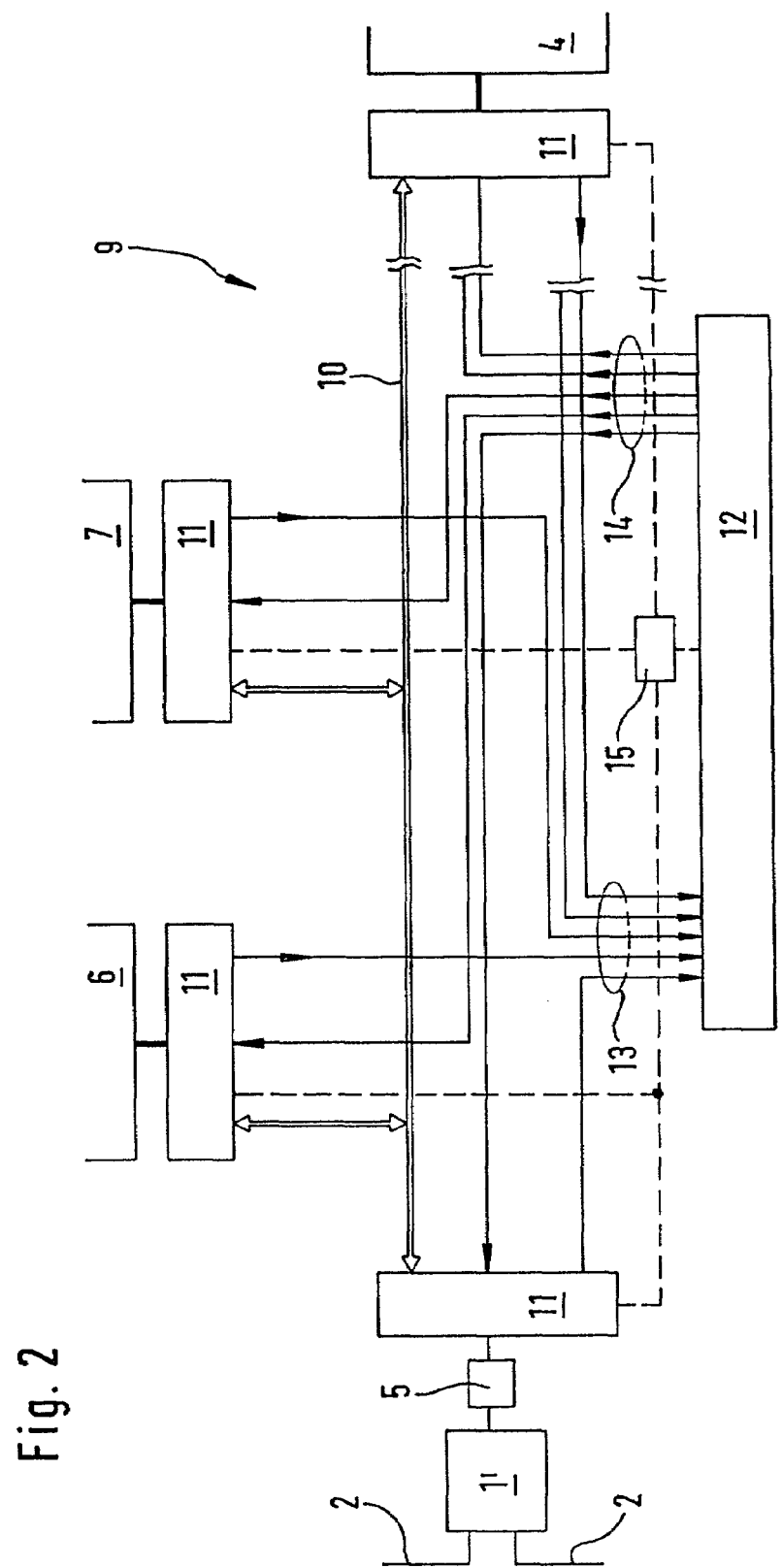
FIG. 2 a schematic depiction of a bus system with transmission control.

The bus system 9 of FIG. 2 has a bus 10 which links a number of access control units 11, also called MACs, i.e. media access controllers, with one another. The left access control unit 11 in FIG. 2 hereby serves for connection to the assigned hub switch 1', whereby, if necessary, the interface unit 5 can be provided between this access control unit 11 and the hub switch 1' in order to be able to convert the signals of the hub switch system into the signals of the bus system 9 and vice versa.

The remaining access control units 11 connect the bus 10 with the central processing unit 6 and the slave processors 7 and/or the programming device 4.

A joint transmission authority control 12 is provided for the access control units 11. This control receives, on one hand, ready-for-sending signals via input-side control lines 13 from the access control units 11 when the module assigned to the respective access control unit 11—hub switch 1', central processing unit 6 and/or slave processor 7 or programming device 4—wants to send data or appropriate data is saved in the respective access control unit 11. The transmission authority control 12 selectively distributes transmission authorities to the previously mentioned access control units 11 via output-side control lines 14.

Synchronization of the units communicating with the clock generator 15 is ensured through a joint clock generator 15 for all access control units 11 and the transmission authority control 12. It could also, for example, be provided that a transmission authority signal only remains effective for one pulse and/or for a predetermined number of pulses and must then be renewed.

The transmission authority control 12 ensures, through appropriate programming, that data is relayed to the bus 10 only via one single access control unit 11 at a time. Colliding data transmissions are thereby prevented. Correspondingly, the transmission capacity of the bus 10 can be used optimally, without any interference from colliding data transmissions.

As a result, the bus system 9 effectively multiplies the terminals of the hub switch 1' leading to the bus system 9.

It is advantageous in regard to the acquisition costs of the entire process control if the bus system 9 is implemented with typical electrical circuit engineering, while for the hub switch system, fiber-optic technology can be advantageous. The hub switch system then serves for networking over long distances, while the relatively economical bus system can be used for networking over relatively short distances.

The bus 8 in FIG. 1 can also be implemented corresponding to the bus system 9 in FIG. 2, with the difference that the bus 8 typically has no direct connection to the neighboring hub switch 1, but merely serves for internal data communication of the programmable controller 3.

In the example of FIG. 2, however, each system part coupled to the bus 10 can, on one hand, communicate with other system parts coupled to the bus 10, and, on the other hand, can also directly communicate via the hub switch 1' with system parts on other hub switches 1.

For smaller process controls, the entire system can, if necessary, also be implemented according to the bus system 9 of FIG. 2, with the left access control unit 11 then connected with a slave processor 7 or similar device, instead of with the hub switch 1'.

As a deviation from the embodiment described above, the fiber-optic cable 2 could also partially or completely be replaced by electrical data lines, insofar as the electromagnetic surroundings cannot lead to interference in data transmissions. The electrical data lines make electro-optical converters unnecessary on the assigned inputs and outputs of the hub switches 1, so that a particularly economical system is possible.

If there is a high potential for electromagnetic interference in the surroundings and/or there are long line paths, the fiber-optic cables 2 are, as a rule, preferred.

The invention claimed is:

1. A network for data transmission comprising a process control having programmable controllers respectively including a central processing unit and slave processors assigned to said central processing unit, and a network linking said controllers for data transmission via hub switches and/or busses provided with several terminals and assigned and/or integrated memory array;
    said hub switches connecting its terminals in pairs while disconnecting them from all other terminals and/or temporarily storing data packets forwarded via the terminals separately and forwarding them to the respectively addressed terminal only when said terminal is available and/or can be made available for data reception;
    said busses linking together access control units which are controlled by a transmission authority control and via which the respective bus receives data from interface modules linked to the busses;
    said programmable controllers being respectively assigned to one of said hub switches and/or busses;
    said hub switch and/or bus having separate terminals for the central processing unit and the slave processors of the assigned controller, thereby enabling each slave processor of a respective controller for exchanging data with an arbitrary controller or a module thereof while circumventing its assigned central processor unit.

2. A network for data transmission comprising a process control according to claim 1,
    wherein connections between the terminals of a hub switch and/or relays of saved data to one of the terminals occur according to presettable priorities.

3. A network for data transmission comprising a process control according to claim 1,
    wherein at least one terminal on at least one hub switch is connected as a programming input.

4. A network for data transmission comprising a process control according to claim 1,
    wherein the hub switches are linked and/or networked with one another via fiberoptic cable.

5. A network for data transmission comprising a process control according to claim 1,
    wherein the hub switches are at least partially linked and/or networked with one another via electrical data lines.

6. A network for data transmission comprising a process control according to claim 1,
    wherein alternatively to the hub switches and/or on a terminal of at least one hub switch, a bus system is provided.

7. A network for data transmission comprising a process control according to claim 6,
    wherein the bus system links together access control units monitored by a transmission authority control, via which the bus of the previously mentioned system is connected with the assigned terminal of the hub switch and/or with a central processing unit, with slave processors and/or with a programming device, with the transmission authority control exclusively switching the transmission authority of the access control units cyclically and/or according to presettable priority.

8. A network for data transmission comprising a process control according to claim 7,
    wherein each bus system has its own transmission authority control.

9. A network for data transmission comprising a process control according to claim 7,
    wherein the access control units temporarily save transmission data of the assigned data modules until transmission authority is received.

10. A network for data transmission comprising a process control with modules linked for data exchange, according to claim 1,
    wherein in said process control with several linked programmable controllers, each including a central processing unit and several slave processors, at least one controller has its central processor and slave processors connected with one another and with the network via a bus system, which links access control units monitored by a transmission authority control, via which the bus of the bus system is connected with the processors and/or with the network, with the transmission authority control exclusively switching the transmission authority of the access control units cyclically and/or according to presettable priority.

* * * * *